the(12) United States Patent
Pearlman et al.

(10) Patent No.: US 8,604,711 B2
(45) Date of Patent: Dec. 10, 2013

(54) INTELLIGENT DIMMER FOR MANAGING A LIGHTING LOAD

(75) Inventors: Gordon Wayne Pearlman, Portland, OR (US); Peter Robert Rogers, Irvine, CA (US); Donald Louis Klusmann, Garland, TX (US)

(73) Assignee: Koninklijke Philips N.V., Eindhoven (NL)

( * ) Notice: Subject to any disclaimer, the term of this patent is extended or adjusted under 35 U.S.C. 154(b) by 221 days.

(21) Appl. No.: 13/320,030

(22) PCT Filed: May 4, 2010

(86) PCT No.: PCT/IB2010/051950
§ 371 (c)(1),
(2), (4) Date: Nov. 11, 2011

(87) PCT Pub. No.: WO2010/131158
PCT Pub. Date: Nov. 18, 2010

(65) Prior Publication Data
US 2012/0049749 A1    Mar. 1, 2012

Related U.S. Application Data

(60) Provisional application No. 61/177,315, filed on May 12, 2009.

(51) Int. Cl.
*H05B 37/02* (2006.01)
(52) U.S. Cl.
USPC ............................ 315/291; 315/297; 315/307
(58) Field of Classification Search
None
See application file for complete search history.

(56) References Cited

U.S. PATENT DOCUMENTS

| | | | |
|---|---|---|---|
| 6,181,086 B1 | 1/2001 | Katyl et al. | |
| 8,310,166 B2 * | 11/2012 | Nagaoka | 315/209 R |
| 2003/0222603 A1 | 12/2003 | Mogilner et al. | |
| 2004/0002792 A1 | 1/2004 | Hoffknecht | |
| 2005/0179404 A1 | 8/2005 | Veskovic et al. | |
| 2007/0273307 A1 | 11/2007 | Westrick et al. | |
| 2008/0183337 A1 | 7/2008 | Szabados | |
| 2010/0176746 A1 * | 7/2010 | Catalano et al. | 315/297 |
| 2012/0007570 A1 * | 1/2012 | Valenti et al. | 323/235 |
| 2012/0091801 A1 * | 4/2012 | Koshin et al. | 307/24 |
| 2013/0057247 A1 * | 3/2013 | Russell et al. | 323/318 |
| 2013/0182744 A1 * | 7/2013 | Catalano et al. | 374/185 |

FOREIGN PATENT DOCUMENTS

WO    2008112181 A2    9/2008

* cited by examiner

*Primary Examiner* — Jany Richardson
(74) *Attorney, Agent, or Firm* — Mark Beloborodov (57) ABSTRACT

An intelligent dimmer (12) for managing a lighting load (172) coupled to an AC voltage source (174) is disclosed. In particular embodiments, the intelligent dimmer (12) may be incorporated into a system (10) and method (220-228) for managing lighting power density. In one embodiment of the intelligent dimmer (12), a control circuit (170) is coupled between the lighting load (172) and the AC voltage source (174). A threshold load current value is established for the lighting load (172). A line voltage sensor (178) reads the line voltage across the lighting load (172) and a load sensor (178) samples the load current being provided to the lighting load (172). The control circuit (170) compares the sampled load current to the threshold load current to determine the presence of a cutoff condition and, in response thereto, selectively adjusts the line voltage applied to the lighting load (172).

15 Claims, 5 Drawing Sheets

INTELLIGENT DIMMER FOR MANAGING A LIGHTING LOAD

This invention relates, in general, to energy management and, in particular, to intelligent dimmers for managing one or more lighting loads so as not to exceed a desired lighting power density.

The green movement and related mandatory energy codes are defining maximum allowable lighting power density, which is an expression in watts per square foot (W/sqft) for a given occupancy/space type. One such baseline standard to which efficient lighting systems adhere is the American Society of Heating, Refrigeration and Air-Conditioning engineers (ASHRAE) 90.1, Energy Standard for Buildings Except Low-Rise Residential Buildings. This standard, continually updated as new lighting technology is developed, sets lighting power density limits for different types of facilities. Municipalities often incorporate ASHRAE 90.1 into local building energy management codes.

From an occupant standpoint, striking a balance between energy efficiency and lighting quality is essential to produce the best lighting system possible. The savings and prestige furnished by austere sustainability practices and adherence to codes, such as the aforementioned ASHRAE 90.1, that achieve low energy bills are false positives if occupants are dissatisfied or unable to work optimally. Intelligent dimmers are part of the solution to not only meet sustainability practices but to successfully strike the balance between efficiency and lighting quality through management of lighting power density.

An intelligent dimmer for managing a lighting load coupled to an AC voltage source is disclosed. In particular embodiments, the intelligent dimmer may be incorporated into a system and method for managing lighting power density to satisfy local building energy management codes, for instance. In particular, in lighting applications using the intelligent dimmer discussed herein, lighting power density or watts per square foot is not exceeded in the original design or later, by adding additional fixtures or higher wattage lamps. The intelligent dimmer furnishes this management of lighting power density by local self-sufficient circuit protection that is free from local supplemental circuit protection such as secondary circuit protectors and overcurrent devices, for example. In this way, the intelligent dimmers presented herein not only aid in meeting sustainability practices but assist with successfully striking the balance between efficiency and lighting quality through management of lighting power density.

In one embodiment of the intelligent dimmer, a control circuit is coupled between the lighting load and the AC voltage source. A threshold load current value is established for the lighting load. A line voltage sensor reads the line voltage across the lighting load and a load sensor samples the load current being provided to the lighting load. The control circuit compares the sampled load current to the threshold load current to determine the presence of a cutoff condition (e.g., an indication that lighting power density is being exceeded or the design standard is not being met) and, in response thereto, selectively adjusts the line voltage applied to the lighting load. The intelligent dimmer may be deployed in any lighting design and with any architecture ranging from a stand alone wall unit to a building networked lighting system using dimmer relay rack controllers, for example.

For a more complete understanding of the features and advantages of the present invention, reference is now made to the detailed description of the invention along with the accompanying figures in which corresponding numerals in the different figures refer to corresponding parts and in which.

DETAILED DESCRIPTION OF THE INVENTION

While the making and using of various embodiments of the present invention are discussed in detail below, it should be appreciated that the present invention provides many applicable inventive concepts which can be embodied in a wide variety of specific contexts. The specific embodiments discussed herein are merely illustrative of specific ways to make and use the invention, and do not delimit the scope of the present invention.

Figure 1:
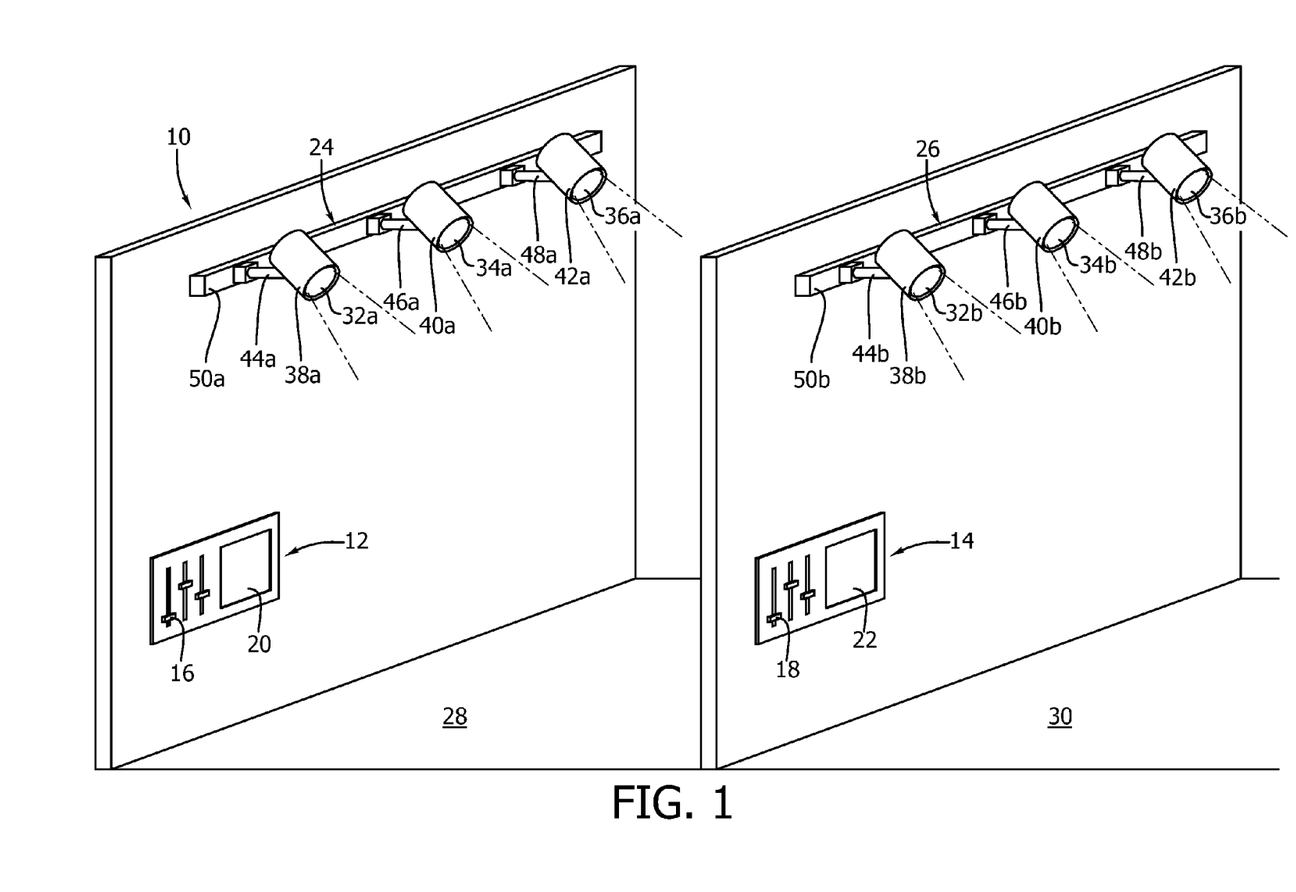
FIG. 1 is a schematic diagram of one embodiment of a system for managing lighting power density including one implementation of an intelligent dimmer.

Referring initially to FIG. 1, therein is depicted a system for managing lighting power density that is schematically illustrated and generally designated 10. The system 10 includes intelligent dimmers 12, 14 having switches 16, 18 and led displays 20, 22 respectively supporting track lighting sections 24, 26 disposed in rooms 28, 30. With respect to the track lighting section 24 in the room 28, lighting loads 32a, 34a, 36a are mounted in respective plug boxes 38a, 40a, 42a via stems 44a, 46a, 48a which are slidably mounted to a track 50a. Each lighting load 32a-36a may be connected to a separate intelligent dimmer or, alternatively, more than one of the lighting loads 32a-36a may be connected to a common intelligent dimmer. That is, as used herein, the term "lighting load" may include one or more lights. Similarly, the room 30 is depicted as having lighting loads 32b, 34b, 36b; plug boxes 38b, 40b, 42b; stems 44b, 46b, 48b; and track 50b. It should be appreciated that although track lighting is depicted, the teachings presented herein may be applied to any type of lighting solution. Additionally, although the system for managing lighting power density and the intelligent dimmer presented herein are shown being utilized within two rooms, it should be appreciated that the system, as well as the methodologies, and intelligent dimmer are applicable to a single room, a zone, a building, or other a networked arrangement, for example. By way of example, in one such implementation, the intelligent dimmer 12, alone, monitors and controls the lighting loads 32a-36a and 32b-36b in both rooms 28, 30. These teachings may be used with any defined area, including hierarchical and networked areas, requiring a lighting solution.

The intelligent dimmer 12 utilizes active current management to ensure lighting power density requirements are satisfied. As mentioned, lighting power density requirements are related to the Watts per square foot of the facility type. In FIG. 1, these requirements are determined by the square footage of the particular room, such as room 28, and the use of the room, such as office. Additionally, in OEM applications, the design voltage of a particular lighting solution, such as track lighting section 24 is known. As 1 Watt equals 1 volt times 1 ampere (1 W=1V 1 A), a threshold load current may be established for ensuring the correct Watts per square foot is maintained. As will be discussed in more detail herein below, depending on the definition of the area, whether room, wing, or building, for example, the threshold load current may be defined as an aggregate value applicable to more than only a room or small area. In one embodiment, a cutoff condition occurs when the designed or designated lighting power density requirement is being met or exceed as measured by the actual load current meeting or exceeding the defined cutoff or threshold load current.

More particularly, in operation, the intelligent dimmer 12 monitors load current being provided to the respective lighting load or locally interconnected lighting loads 32a-36a, for example. In response to a sampled load current satisfying a cutoff condition determined by comparing the sampled load current to an established threshold load current, the intelligent dimmer 12 selectively adjusts the line voltage applied to the lighting loads 32a-36a in order to govern and maintain the lighting loads 32a-36a within the lighting power density requirements.

Figure 2:
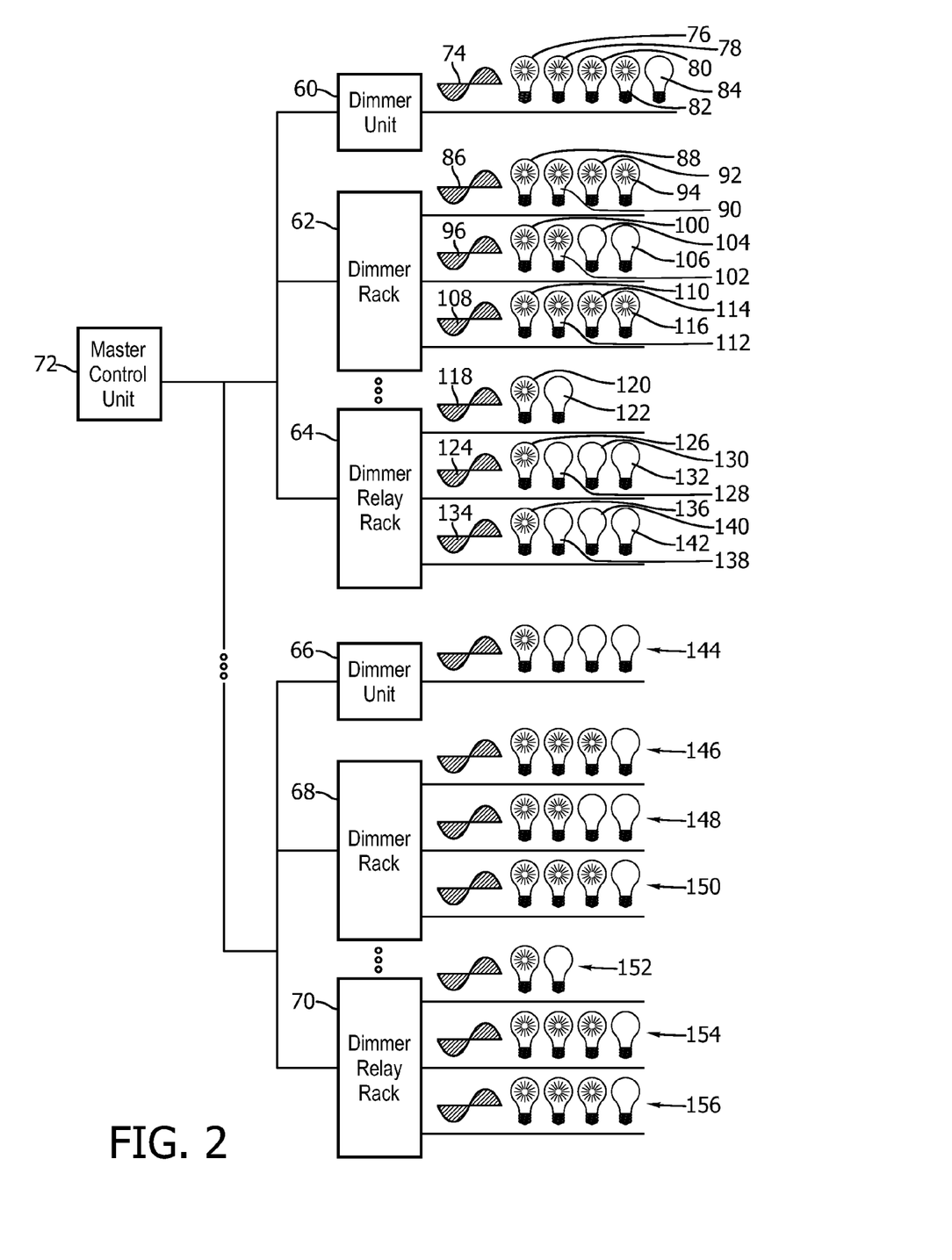
FIG. 2 is a functional block diagram of another embodiment of a system for managing lighting power density wherein no cutoff conditions are present.

FIG. 2 depicts another embodiment of the system 10 for managing lighting power density. A dimmer unit 60, a dimmer rack module 62, a dimmer relay rack module 64, a dimmer unit module 66, a dimmer rack module 68, and a dimmer relay rack module 70 are networked to a master control unit 72, which may be a building and zone controller, for example. As mentioned, the dimmers 60-72 may be individually charged with an area or assigned to groups that represent all of the lighting in a given area so that the total or aggregate amperage is sampled or calculated and all of the intelligent dimmers 60-72 instructed to dim or otherwise phase back the appropriate lighting loads to ensure that the watts per square foot for the area under management is not exceeded.

The dimmer unit 60 and the dimmer rack module 62 perform appropriate subsets of the functions of the dimmer relay rack module 62, which functions include command, configuration, and control functions. By way of example, the dimmer relay rack module 72 configures each dimmer in the rack, including setting operational parameters for each dimmer, setting threshold load currents, and providing instructions for handling cutoff conditions and post-cutoff conditions, e.g., returning to a particular lighting intensity in a sub-area when overall area conditions permit. The dimmer rack control module 72 also sends dimming level commands to all dimmers for normal operation. Dimmer status may be collected from each dimmer and further dimming decisions made based upon the status on the basis of a common track, room, or zone, for example. Moreover, communications with room and zone keypads, such as the master control unit 72, for example, are enabled as are communications with any other building management system.

As depicted, the dimmer units 60, 66, dimmer rack modules 62, 68, and dimmer relay rack modules 64, 70 may be dispersed throughout a building in different rooms or areas. Moreover additional modules and modules of other types may be including the illustrated lighting solution deployment. All lighting loads are being managed within the maximum allowable lighting power densities and no cutoff conditions are present.

More particularly, the dimmer unit 60 supplies line voltage 74 to lighting loads 76-84, of which lighting loads 76-82 are ON. The dimmer rack module 62 supplies line voltage 86 to lighting loads 88-94, all of which are ON as indicated by the "light" symbol within the particular lighting load. On the other hand, an absence of the "light" symbol, as with lighting load 84, indicates that the particular lighting load is OFF. Line voltage 96 is supplied to lighting loads 100-106 and line voltage 108 is supplied to lighting loads 110-116. The dimmer relay rack module 64 supplies line voltage 118 to lighting loads 120-122, line voltage 124 to lighting loads 126-132, and line voltage 134 to lighting loads 136-142. The dimmer unit 66, the dimmer rack module 68, and the dimmer relay rack module 70 have similar provisioning as represented by numerals 144-156.

Figure 3:
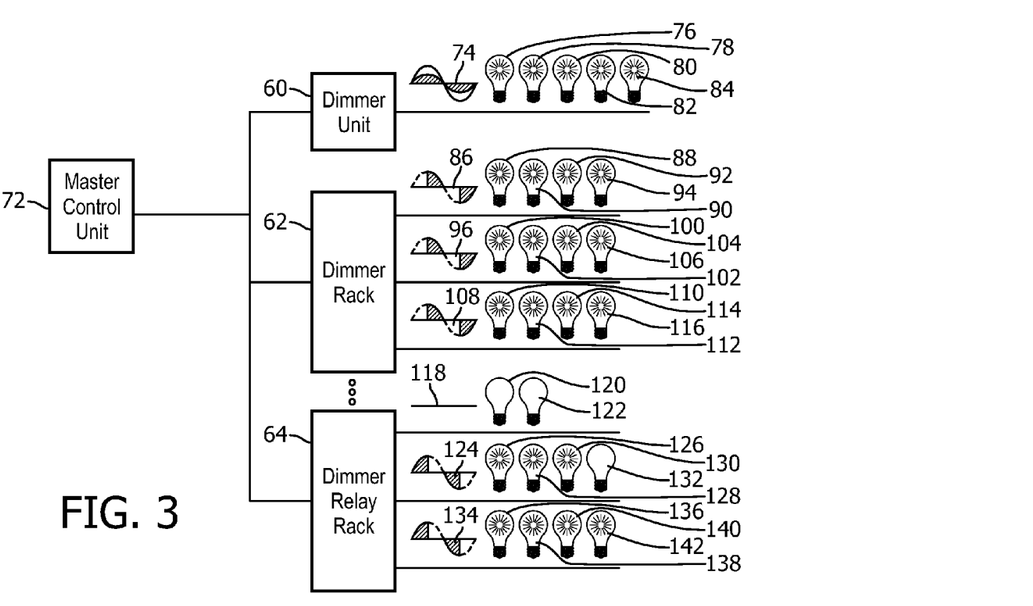
FIG. 3 is a functional block diagram of a portion of the system illustrated in FIG. 2 wherein cutoff conditions are present.

FIG. 3 is a functional block diagram of a portion of the system 10 illustrated in FIG. 2 wherein cutoff conditions are present. As shown by a comparison of FIGS. 2 and 3, dimmer unit 60 is experiencing a greater lighting load brought on by the ON status of lighting load 84. Similarly, the addition of ON lighting loads 104, 106 has increased the load on the dimmer rack controller 62 and the addition of ON lighting load 142 has increased the load on the dimmer relay rack controller 64. In one embodiment, each of the dimmers 60, 62, 64 must adjust the applied line voltages in order to reduce the Wattage per square foot in response to detecting a cutoff condition.

By way of particular example, with respect to the dimmer rack module 62, the locally interconnected lighting loads 88-94, locally interconnected lighting loads 100-106, and locally interconnected lighting loads 110-116 are being monitored by the dimmer rack module 62 which reads or samples the respective load currents being applied to each of these locally interconnected lighting loads. In one embodiment, all of these interconnected lighting loads are in a single room and subject to a maximum allowable lighting power density as expressed in watts per square foot (W/sqft). The dimmer rack module 62 samples the load current being applied to the interconnected lighting loads 88-94, 100-106, 110-116 and then aggregates the sampled load currents of the interconnected lighting loads. The dimmer rack module 62 then compares this aggregated sampled load current to a stored threshold load current. All of the locally interconnected lighting loads 88-94, 100-106, 110-116 are ON and, under these conditions, the threshold load current is exceeded, which is an indication that the watts per square foot (W/sqft) is being exceeded as well. The dimmer rack module 62, which includes intelligent dimmers, then selectively adjusts the line voltages 86, 96, 108 applied to the locally interconnected lighting loads in response to the aggregate sampled load current exceeding the threshold load current and a cutoff condition being established. Similar corrective actions are undertaken by the dimmer unit 60 and the dimmer relay rack controller 64. Moreover, in embodiments, where the dimmer unit 60 and the dimmer 62 rack are located in a common area, such as a room, the individual load currents are aggregated to compare to an aggregate threshold load current to determine if a cutoff condition has occurred. In instances where a cutoff condition is present, the master control unit may coordinate the selective adjustment of the applied line voltages to multiply intelligent dimmers.

Figure 4:
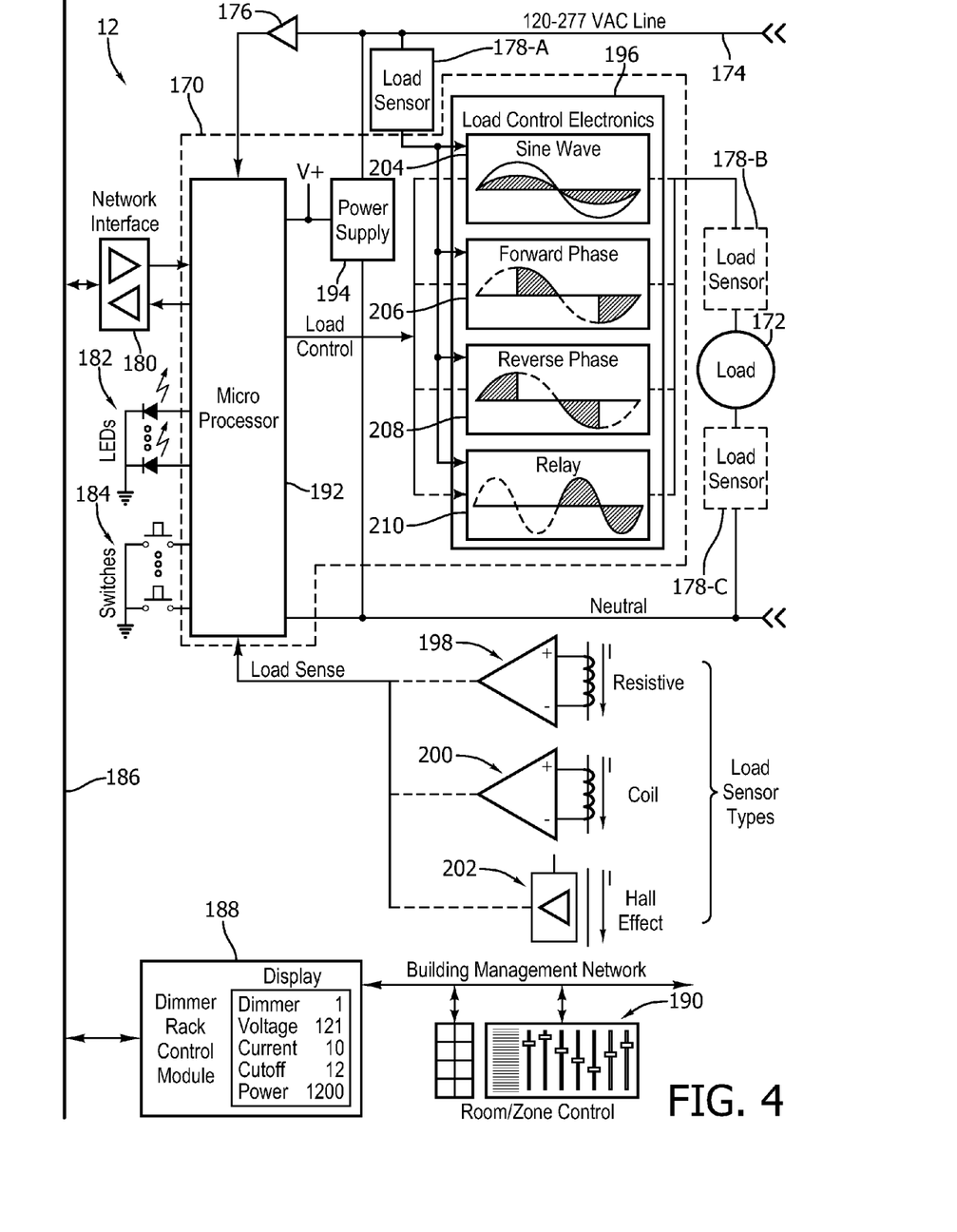
FIG. 4 is a schematic circuit diagram of one embodiment of the intelligent dimmer.

FIG. 4 shows one embodiment of the intelligent dimmer 12. A control circuit 170 is coupled between the lighting load 172, which may include one or more bulbs or lights, and an AC voltage source from line 174, which may be providing between 100 and 300 $V_{AC}$, 50/60 Hz. A line voltage sensor 176 is coupled between the lighting load 172 and the AC voltage source from line 174 and located in communication with the control circuit 170 in order to read the line voltage across the lighting load 172. A load sensor 178 is located in communication with the control circuit to sample the load current being provided to the lighting load 172. As shown, the load sensor 178 may be placed between the AC voltage source and the load control electronics (load sensor 178-A) or, for example in other implementations, between the output of the load control electronics and the lighting load (load sensor 178-B), or between the lighting load and neutral (load sensor 178-C).

A network interface 180, LEDs 182, and switches 184 are also electrically coupled to the control circuit 170. The network interface 180 provides a connection to the network, represented by number 186, which connects the intelligent dimmer 12 to a dimmer rack control module 188 and a building management network 190. The LEDs 182 furnishing various status information and the switches 184 provide for dimming control of the lighting load 172. More particularly, the LEDs 182 may display the status of the dimming level, overcurrent or cutoff conditions, and over current phase back conditions, for example.

The network interface 180, which is depicted, but not used for stand alone wallbox applications, provides an interface for the intelligent dimmer to receive command, configuration, and control instructions from a remote source, such as a master control module represented by dimmer rack control module 188, for example. Such command, configuration, and control instructions may relate to the level of dimming, fade rate when changing dimming levels, setting for the threshold load current, and response to post-cutoff conditions. Via the network interface 180, the intelligent dimmer 12 may transmit its status to the dimmer rack control module 188. Such status information may include its dimming level, line voltage, load current, load wattage, dimmer temperature, or error statuses, for example.

The control circuit 170 includes a processor circuit portion 192, which may be microprocessor, a power supply 194, and load control electronics 196. The processor circuit portion 192 compares the sampled load current to the threshold load current. The power supply portion 194 regulates the line voltage provided by the AC voltage source from line 174. In one implementation, the power supply portion 194 converts the line voltage received from the AC power source to the voltage typically required for operation of the lighting load by the intelligent dimmer. By way of example, line voltage of between 100 and 300 $V_{AC}$, 50/60 Hz may be converted to between +3 $V_{DC}$ and +24 $V_{DC}$. The load control electronics portion 196 selectively adjusts the line voltage applied to the lighting load 172 in response to the cutoff condition.

Returning to the load sensor 178, the sensing of the load current may be accomplished using in one of several techniques. By way of example, the load sensor 178 may be placed in series with respect to the lighting load 172 in order to determine the load current by measuring the voltage across a resistor of known resistance. With respect to one particular implementation, the resistance may be usually in the 0.01Ω to 1Ω range. The load current may be calculated by dividing the measured voltage across the load resistor by the value of the resistor. For example, a measured voltage of 1.2 V across a 0.1Ω resistor would signify a 12 A load current. In this embodiment, the load sense or measured load current is provided to the processor circuit portion as shown by numeral 198.

In another application, the load sensor 198 determines the load current by measuring the voltage across coil windings wrapped around a wire connection of the lighting load as shown by numeral 200. This particular methodology does not interfere with the lighting load and provides isolation between the load and the load sensor. In still another application, the load sensor 198 determines the load current by measuring the voltage produced across a Hall effect device that is associated with the lighting load. As indicated by numeral 202, the Hall effect device may be located in close proximity to a lighting load wire or an etch on a dimmer board. In operation, the load current produces a proportional voltage across the Hall Effect device without any interference to the lighting load while providing isolation between the lighting load and the load sensor.

The aforementioned load control electronics portion 196 controls, and in some instances, dims the intensity of the lighting load 172 by any one of various means. By way of example, the load control electronics portion 196 may include a sine wave control circuit 204, a forward phase control circuit 206, a reverse phase control circuit 208, or a relay control circuit 210. The sine wave control circuit 204 adjusts the amplitude of sine wave voltage across the lighting load. The forward phase control circuit 206 controls the duration of line voltage cycle. In particular, the time during which the cycle of the line voltage is turned ON and OFF is controlled. A triac or dual-semiconductor-controlled rectifiers (also known as dual-silicon-controlled rectifies or SCRs) may be employed for such load switching between the ON and OFF states.

The reverse phase control circuit 208 controls the duration of line voltage cycle and the when the applied line voltage is turned OFF as opposed to on with the forward phase control circuit. The relay control circuit 210 alternates the line voltage between ON and OFF states by way of a relay and in this embodiment, no dimming takes place.

In operation, the processor circuit portion 192 monitors the line voltage sensor 176 and controls the load control electronics 196 to set dimming levels from OFF to ON by controlling the timings of the load control electronics to adjust the amount of line voltage that the lighting load sees. The processor circuit portion 192 also monitors the load sense inputs to calculate the level of current, e.g., load current, flowing through the lighting load 172.

The processor circuit portion 192 stores the threshold load current and compares the actual load current to the threshold load current. If the threshold load current is met (or exceeded, depending on the programming configuration), the processor circuit portion 192 selectively adjusts the line voltage applied to the lighting load 192 in response to the cutoff condition. Timing filters are applied to allow for any temporary current spikes to a variety of circumstances including inrush current when the lighting load is turned ON, and line noise, for example.

In this configuration, dimming levels may be generated by the attached switches 184 in standalone configurations or be set from a dimmer rack control module 188 through the network interface 180. It should be appreciated that the generation of dimming levels may be both configurable from the attached switches 184 and remotely via the network interface 180 depending on the configuration.

The threshold current load, or cutoff current level, may be set locally through the switches 187 and the LEDs 182 or learned by sensing a present level of current conditions and adding a cutoff offset, such as a 10% increase in the measured current load. Still, in another embodiment, the threshold current load may be set remotely through the network interface 180 and the dimmer rack control module 188, for example. In instances where the threshold current load is set remotely, the process transmits the measured current load to the remote location so that the dimmer rack control module 188, for example, can make the decision on when to phase back or turn OFF the load, thereby allowing the threshold current load to be spread among several dimmers that control lighting circuits in a common area.

In this way, the control circuit 170 includes local self-sufficient circuit protection such that the intelligent dimmer 12 is free from local supplemental circuit protection, such as secondary circuit protectors and overcurrent devices. The existing practice of adding a secondary circuit protector rated at a specified amperage is eliminated. In this practice, for example, a secondary circuit protector would be required having an 8 A rating if the circuit design intended on limiting the lighting load to 8 A. This eliminated secondary circuit protector would have been placed downstream of a typical 15/20 A primary breaker, for example. Therefore, the additional space and cost requirements associated with the secondary circuit protector are eliminated.

Figure 5:
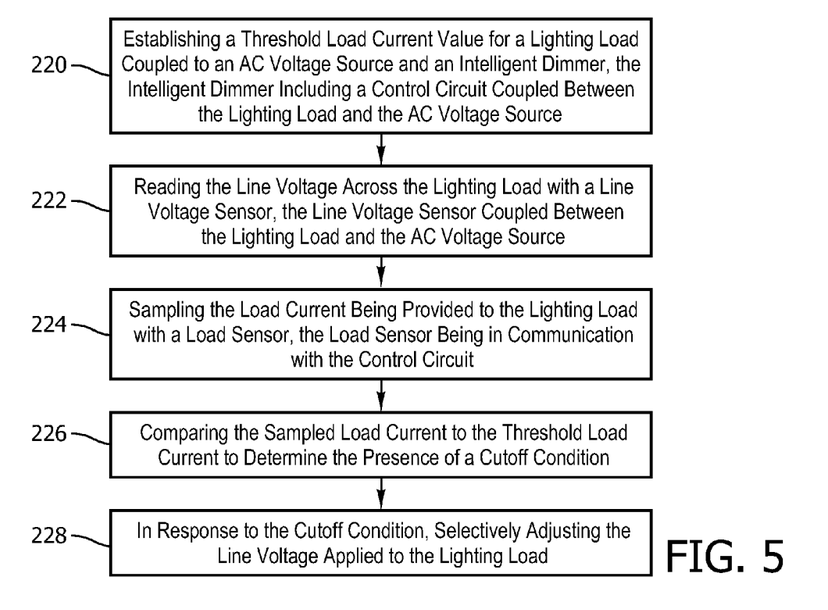
FIG. 5 is a flow chart of one embodiment of a method for managing lighting power density.

FIG. 5 shows a method for managing lighting power density. At block 220, a threshold load current value is established for a lighting load coupled to an AC voltage source and an intelligent dimmer. As previously discussed, the intelligent dimmer includes a control circuit coupled between the lighting load and the AC voltage source. At block 222, the line voltage across the lighting load is read with a line voltage sensor. The line voltage sensor may be coupled between the lighting load and the AC voltage source. Continuing to block 224, the load current being provided to the lighting load is sampled with a load sensor, which is located in communication with the control circuit. At block 226, the sampled load current is compared to the threshold load current to determine the presence of a cutoff condition. In response to the cutoff condition at block 228, the line voltage applied to the lighting load is selectively adjusted. The adjustment may include reducing the voltage, altering the timing and phasing, ceasing the application of the voltage, or a combination thereof.

Figure 6:
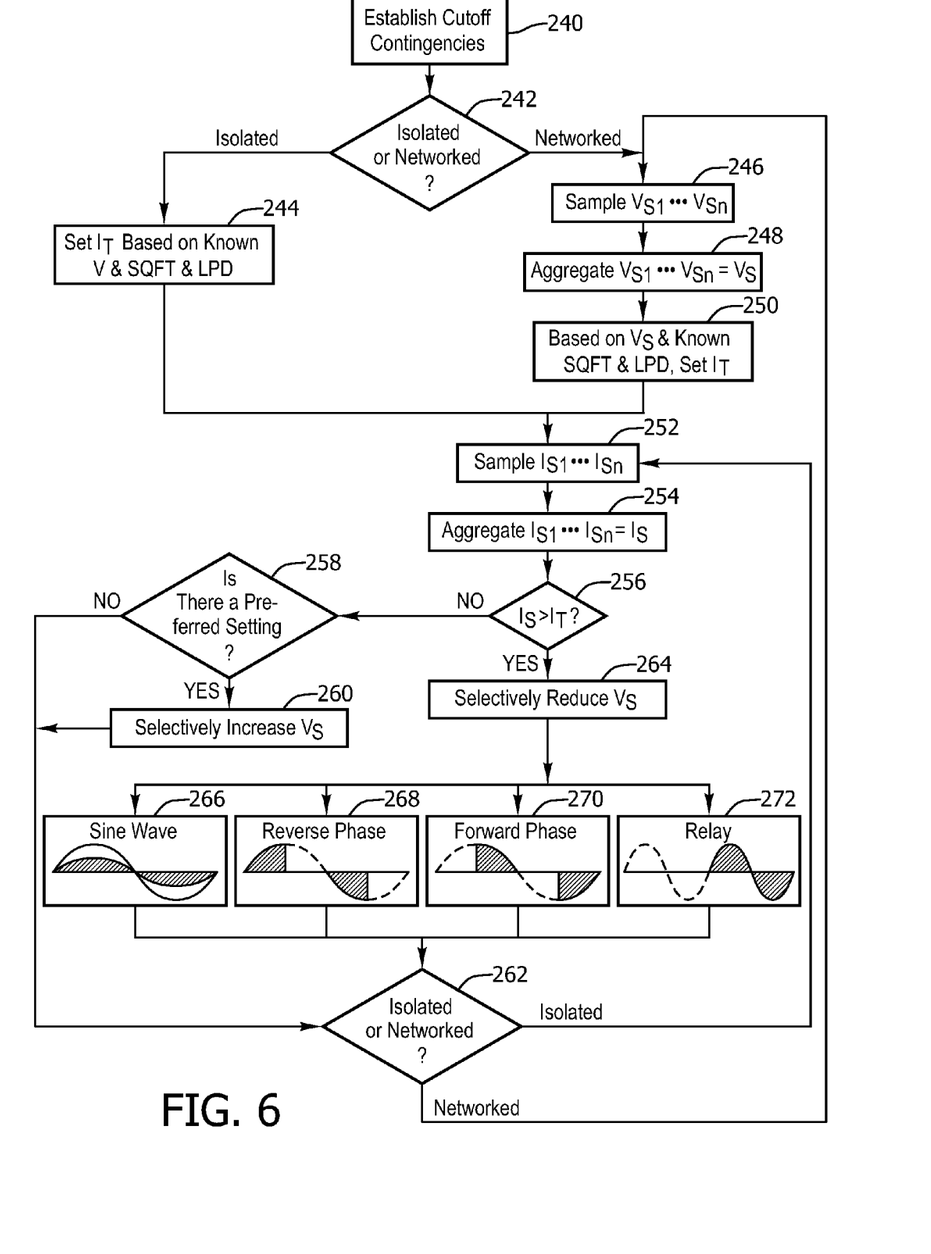
FIG. 6 is a flow chart of another embodiment of a method for managing lighting power density.

FIG. 6 depicts another method for managing lighting power density using an intelligent dimmer used to monitor the designed current such that if the current reaches the design limit, then the dimmer will not allow the level to increase. At block 240, various cutoff contingencies are established for the lighting system including programming for dimming, post-cutoff condition practices, and other demand response priorities. At block 242, if the lighting load under management is isolated, then the methodology continues to block 244 where a threshold current load ($I_T$) is set based on the known voltage, square feet of the lighting application space, and the desired or required lighting power density (LPD). Such a setting of the threshold current load may occur at the factory as an OEM setting and/or be set/updated in the field through the use of the intelligent dimmer. Such a threshold load current could be alternatively adjusted by an authorized technician.

On the other hand, if the lighting load under management is under the control of a networked intelligent dimmer, then the process continues to block 246 where the voltage of each lighting load ($V_{S1} \ldots V_{Sn}$) is sampled. The voltages are then aggregated (VS) at block 248 and based upon the voltage and known square feet and lighting power density requirement, the value of the threshold current load for the area under management may be set dynamically and appropriately circulated through the networked intelligent dimmers. Alternatively, in a networked intelligent dimmer configuration, the approach of block 244 may be also employed.

Following both blocks 244 and 250, the relevant current loads ($I_{S1} \ldots I_{Sn}$) are sampled at block 252 and, if applicable, aggregated at block 254 to provide the current load ($I_S$). At decision block 256, the current load is compared to the threshold current load ($I_T$) to determine if the lighting loads are exceeding the designed energy management guidelines. If the current load does not exceed the threshold current load, then the methodology advances to block 258 where an option is provided to return to a preferred setting at block 260. For example, a particular room or area may have a pre-programmed or preferred setting for the lighting loads that could not have been met due to a demand in another portion of the room or area. Following the satisfaction and elimination of this temporal demand, the lighting loads have the opportunity to return to the previously preferred setting at block 260. Following a "NO" at block 258 and the "YES" route through block 260, the methodology continues to decision block 262, where if the lighting load being managed by the intelligent dimmer is isolated, then the process returns to block 252. Otherwise, in a situation with lighting loads supported by networked intelligent dimmers, the process continues onto block 246.

Returning to decision block 256, if the load current exceeds the threshold load current, then the lighting load or loads under management may have exceeded the lighting power density requirements previously established. The method then continues to block 264 where the line voltage ($V_S$) supplied to the lighting load is selectively adjusted so as to bring the lighting load into compliance with the lighting power density requirements. It should be appreciated that depending on the configuration of the management system, in some embodiments, if the load current meets or exceeds the threshold load current, then the line voltage is also adjusted.

As previously discussed, there are arrangements available to adjust or otherwise limit the line voltage being supplied to the lighting load when a cutoff condition arises. As shown in blocks 266-272, in a sine wave adjustment methodology, the line voltage is reduced as shown by the comparison of the shaded area (reduced applied line voltage) to the larger sine wave outline (previously applied line voltage). Reverse phase adjustments are also possible where the line voltage alternates between times $t_{ON}$, $t_{OFF}$, $t_{ON}$, and $t_{OFF}$. In this arrangement, the period of the applied line voltage is split between two equal half-cycles wherein the intensity of lighting load is controlled by limiting and/or reducing the time $t_{ON}$. In a forward phase voltage correction scheme, the line voltage is similarly adjusted between times $t_{OFF}$, $t_{ON}$, $t_{OFF}$, $t_{ON}$. As a further alternative, by use of a relay, for example, the application of line voltage can be selectively terminated. By way of a further embodiment, relays with current sensing circuitry could be utilized in place of the dimmers. In this application, the relays with current sensing circuitry would shutdown when an overload or current cutoff condition was detected. This would have particular advantages in instances with groups where prioritization between low and high priority circuits is required. Following the adjustment or correction of the line voltage at blocks 266-272 the methodology advances to the previously discussed decision block 262.

While this invention has been described with reference to illustrative embodiments, this description is not intended to be construed in a limiting sense. Various modifications and combinations of the illustrative embodiments as well as other embodiments of the invention, will be apparent to persons skilled in the art upon reference to the description. It is, therefore, intended that the appended claims encompass any such modifications or embodiments.

The invention claimed is:

1. An intelligent dimmer for managing a lighting load coupled to an AC voltage source, the intelligent dimmer comprising:
    a control circuit coupled between the lighting load and the AC voltage source, the control circuit having a threshold load current value for the lighting load associated therewith;
    a line voltage sensor coupled between the lighting load and the AC voltage source in communication with the control circuit, the line voltage sensor for reading the line voltage across the lighting load; and a load sensor located in communication with the control circuit, the load sensor for sampling the load current being provided to the lighting load, wherein the control circuit compares the sampled load current to the threshold load current to determine the presence of a load current cutoff condition, the control circuit selectively adjusting the line voltage applied to the lighting load in response to the load current cutoff condition.

2. The intelligent dimmer as recited in claim 1, wherein the control circuit comprises local self-sufficient circuit protection.

3. The intelligent dimmer as recited in claim 1, further comprising the intelligent dimmer being free from local supplemental circuit protection.

4. The intelligent dimmer as recited in claim 3, wherein the local supplemental circuit protection comprises a device selected from the group consisting of secondary circuit protectors and overcurrent devices.

5. The intelligent dimmer as recited in claim 1, wherein the control circuit further comprises:
a processor circuit portion for comparing the sampled load current to the threshold load current;
a load control electronics portion for selectively adjusting the line voltage applied to the lighting load in response to the load current cutoff condition; and
power supply portion for regulating the line voltage provided by the AC voltage source.

6. A system for managing lighting power density, the system comprising:
a first plurality of locally interconnected lighting loads receiving a first line voltage from a first AC voltage source;
a second plurality of locally interconnected lighting loads receiving a second line voltage from a second AC voltage source;
a first intelligent dimmer connected to the first plurality of locally interconnected lighting loads, the first intelligent dimmer for monitoring a first load current being provided to the first plurality of locally interconnected lighting loads; and
a second intelligent dimmer) connected to the second plurality of locally interconnected lighting loads, the second intelligent dimmer for monitoring a second load current being provided to the second plurality of locally interconnected lighting loads,
wherein the first intelligent network dimmer is in communication with the second intelligent dimmer, and the first and second intelligent dimmers respectively selectively adjust the first and second line voltages applied to the first and second plurality of locally interconnected lighting loads in response to an aggregate sampled load current satisfying a load current cutoff condition determined by comparing the aggregate sampled load current to an established threshold load current, the aggregate sampled load current including a sum of the first sampled load current and the second sampled load current.

7. The system as recited in claim 6, wherein the first and second intelligent dimmers comprise local self-sufficient circuit protection.

8. The system as recited in claim 6, further comprising the first and second intelligent dimmers being free from local supplemental circuit protection.

9. The system as recited in claim 6, wherein the first AC voltage source and the second AC voltage source comprise identical AC voltage sources.

10. The system as recited in claim 6, wherein the first plurality of locally interconnected lighting loads and the second plurality of locally interconnected lighting loads are distally located.

11. The system as recited in claim 6, wherein the first plurality of locally interconnected lighting loads and the second plurality of locally interconnected lighting loads are located in a common lighting area.

12. The system (10) as recited in claim 6, wherein the first plurality of locally interconnected lighting loads are connected to switches and a display.

13. A method for managing lighting power density, the method comprising:
establishing a threshold load current value for a lighting load coupled to an AC voltage source and an intelligent dimmer, the intelligent dimmer including a control circuit coupled between the lighting load and the AC voltage source;
reading the line voltage across the lighting load with a line voltage sensor, the line voltage sensor coupled between the lighting load and the AC voltage source;
sampling the load current being provided to the lighting load with a load sensor, the load sensor being in communication with the control circuit;
comparing the sampled load current to the threshold load current to determine the presence of a load current cutoff condition; and
in response to the load current cutoff condition, selectively adjusting the line voltage applied to the lighting load.

14. The method as recited in claim 13, further comprising providing local self-sufficient circuit protection.

15. The method as recited in claim 13, further comprising providing the intelligent dimmer to be free from local supplemental circuit protection.

* * * * *